No. 749,753. PATENTED JAN. 19, 1904.
L. H. SOISSON.
DETACHABLE HANDLE.
APPLICATION FILED AUG. 20, 1903.
NO MODEL.

Witnesses:
K. H. Butler
E. E. Potter

Inventor
L. H. Soisson,
By N. C. Everett & Co.
Attorneys

No. 749,753. Patented January 19, 1904.

UNITED STATES PATENT OFFICE.

LOUIS H. SOISSON, OF CONNELLSVILLE, PENNSYLVANIA.

DETACHABLE HANDLE.

SPECIFICATION forming part of Letters Patent No. 749,753, dated January 19, 1904.

Application filed August 20, 1903. Serial No. 170,143. (No model.)

*To all whom it may concern:*

Be it known that I, LOUIS H. SOISSON, a citizen of the United States of America, residing at Connellsville, in the county of Fayette and State of Pennsylvania, have invented certain new and useful Improvements in Detachable Handles, of which the following is a specification, reference being had therein to the accompanying drawings.

This invention relates to certain new and useful improvements in detachable handles, and relates more particularly to handles adapted for lifting kitchen utensils—such as skillets, pans, pots, and various other like articles—the object of the invention being to provide a handle by means of which a utensil can be conveniently manipulated and which handle is readily detachable from the utensil, whereby the handle will not be subjected to the heat from the stove or range, and thus the handle will be kept cool at all times.

Another of the objects of my invention is to construct a handle of this character which will permit of the tilting of the utensil without danger of disengagement from the handle.

The invention resides in the novel construction, which will be hereinafter more fully set forth, and particularly pointed out in the claim, and in describing the invention in detail reference is had to the accompanying drawings, forming a part of this specification, and wherein like numerals of reference indicate like parts throughout the several views, in which—

Figure 1:
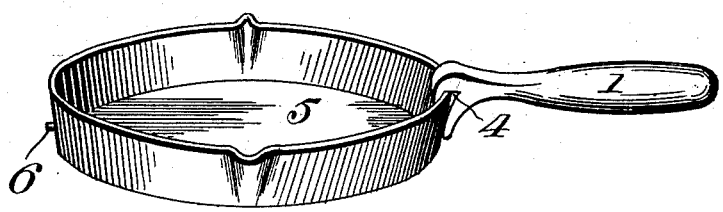
Figure 2:
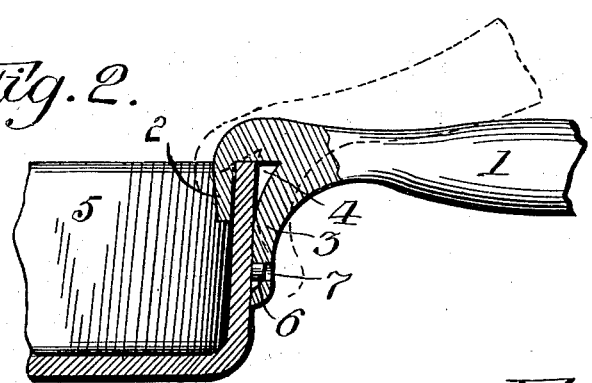
Figure 3:
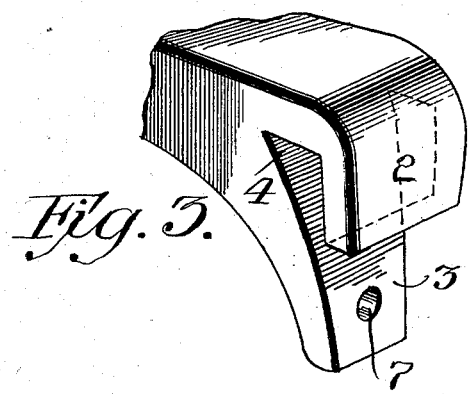
Figure 4:
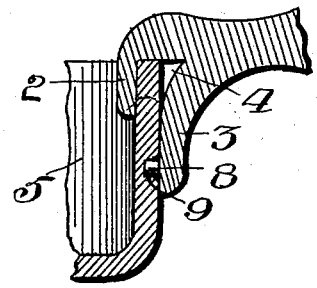

Figure 1 is a detail perspective view showing the application of my improved handle to a skillet. Fig. 2 is a longitudinal sectional view, partly broken away. Fig. 3 is a detached detail perspective view of the handle, partly broken away. Fig. 4 is a sectional view, partly broken away, showing a modified form of construction.

My improved handle may be conveniently cast, and consequently may be manufactured at a comparatively small cost. The device consists of a handle-body 1, made of a suitable shape to form an easy grip for the hand. At its forward or engaging end this handle is enlarged and formed into two projecting lips 2 3, both extending substantially at right angles to the handle-body 1. The lip 3 is made of a considerable greater length than the lip 2, the inner face of this lip being on a substantially straight line for about half the length of said face, the line of said face then extending on a gradual curve to the substantially centrally horizontal line of the handle-body. This curving of the face of the lip 3 produces an opening 4 between the outer surface of the pan or skillet and the curved portion of the face, giving sufficient clearance whereby the handle may be thrown up, as indicated in Fig. 2, in order to disengage the same from the skillet or other utensil. The inner face of the lip 2 is on a straight line parallel with the straight line portion of the inner face of the lip 3, the inner face of said lip 2 being adapted to engage the inner face of the skillet or other utensil at the same time that the parallel portion of the face of lip 3 engages the outer face of the skillet. The skillet or other utensil 5 may be provided with a pin 6 to engage in the aperture 7, provided therefor in the lip 3, as seen in Figs. 1 and 2, or, as seen in Fig. 4, the lip 3 may be provided with a pin 8 to engage in the socket 9, provided therefor in the utensil 5. Aside from this change the construction shown in Fig. 4 is identical with that shown in Figs. 1, 2, and 3. I preferably provide two pins 6 at opposite sides of the skillet, as seen in Fig. 1, or may provide two recesses 9 in the skillet or other utensil, whereby the handle may be engaged at either side of the utensil. It will be observed that when the handle is in position on the utensil the top wall of the opening between the two lips engages with the upper edge of the utensil and by reason of the lip 3 being engaged with the utensil may only be disengaged by lifting up on the handle. It will be observed that the handle may be used for tilting the utensil in order to pour out the contents thereof, the handle holding perfectly at all positions except possibly the complete inverting of the utensils. After using the handle for placing the utensil on the stove or range the handle may be readily detached, and thus will always be cool when it is desired to again move the utensil.

It will be obvious that various slight changes may be made in the details of construction without departing from the general spirit of my invention.

Having fully described my invention, what I claim as new, and desire to secure by Letters Patent, is—

The combination of a cooking utensil and a detachable handle for said utensil, said handle comprising a handle-body provided at its forward end with two right-angular-extending lips, one of said lips being of considerably greater length than the other of said lips, and having a portion of its inner face on a straight line parallel with the straight line inner face of the shorter lip, the remainder of said inner face of the longer lip curving rearwardly toward the handle, the said cooking utensil and the said longer lip of the handle being provided the one with an aperture and the other with a pin adapted to be brought into engagement with each other.

In testimony whereof I affix my signature in the presence of two witnesses.

LOUIS H. SOISSON.

Witnesses:
H. C. EVERT,
A. M. WILSON.